May 25, 1948.  F. L. DAVIS, JR  2,442,117

DRAWING APPARATUS (PERSPECTOGRAPH)

Filed Sept. 21, 1945    7 Sheets-Sheet 1

DIRECT PROJECTION METHOD
OF CONSTRUCTING A PERSPECTIVE VIEW GRAPHICALLY

INVENTOR
FRANK L. DAVIS JR.
BY
ATTORNEY

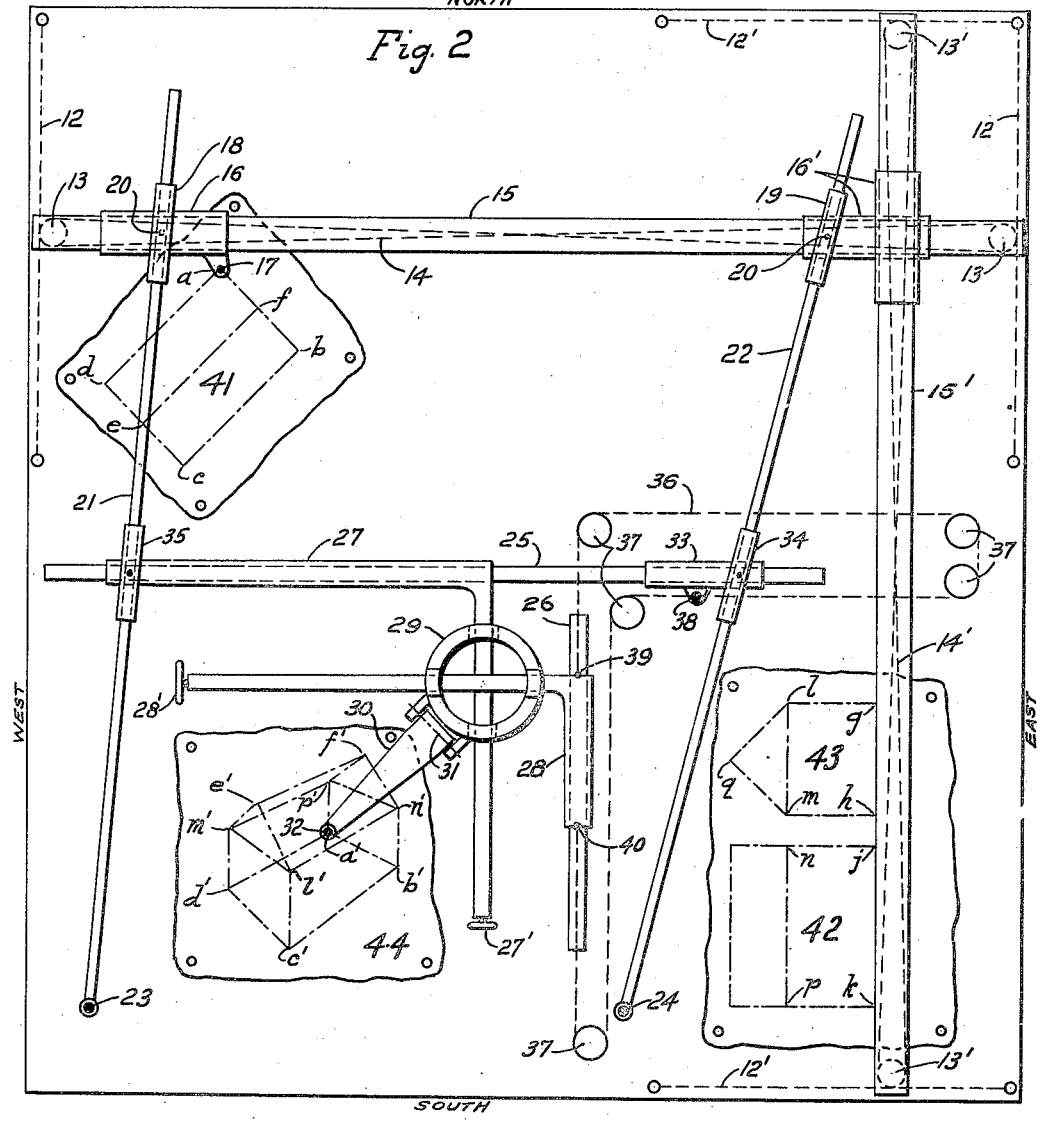

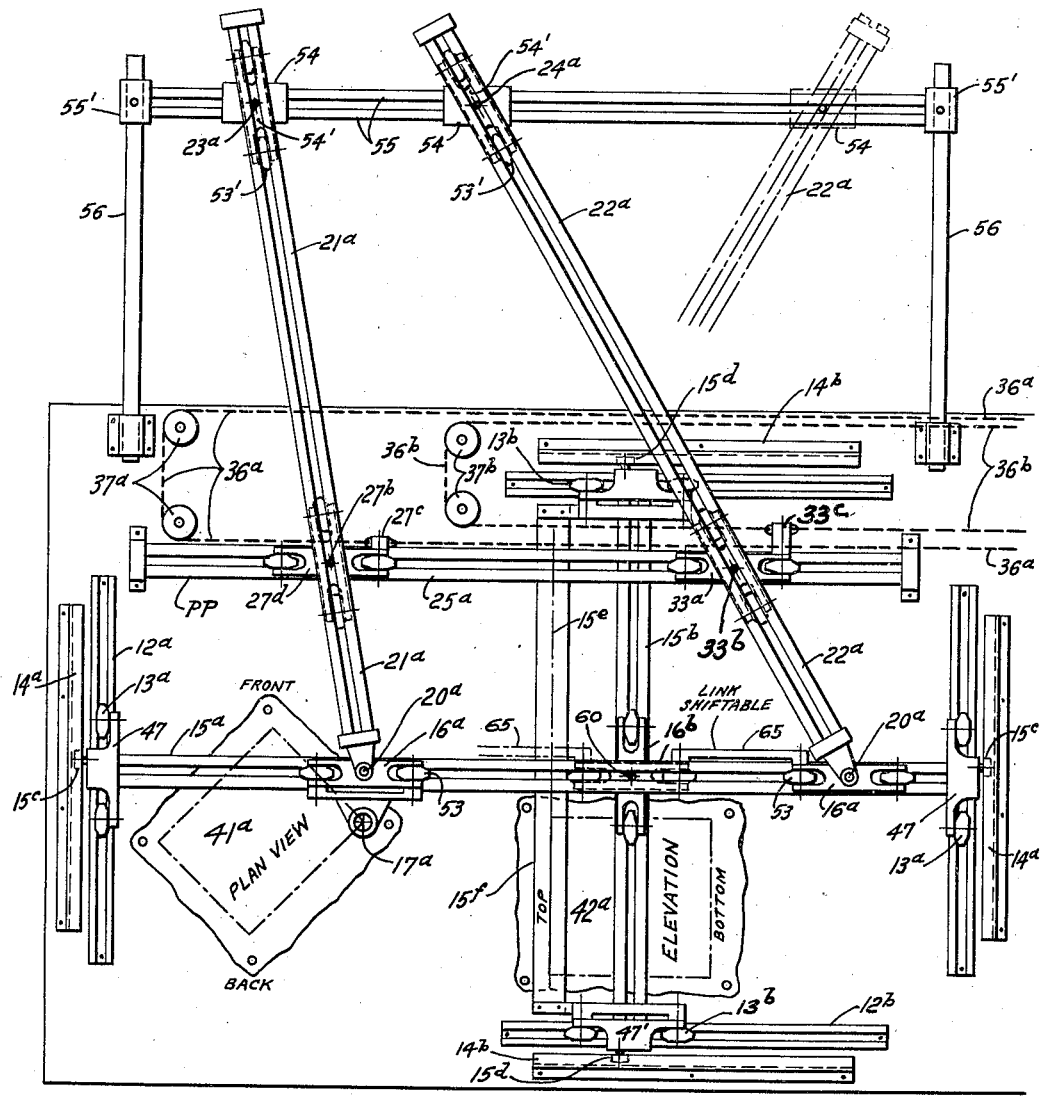

May 25, 1948.  F. L. DAVIS, JR  2,442,117
DRAWING APPARATUS (PERSPECTOGRAPH)
Filed Sept. 21, 1945  7 Sheets-Sheet 4
*Fig. 3ᵃ*
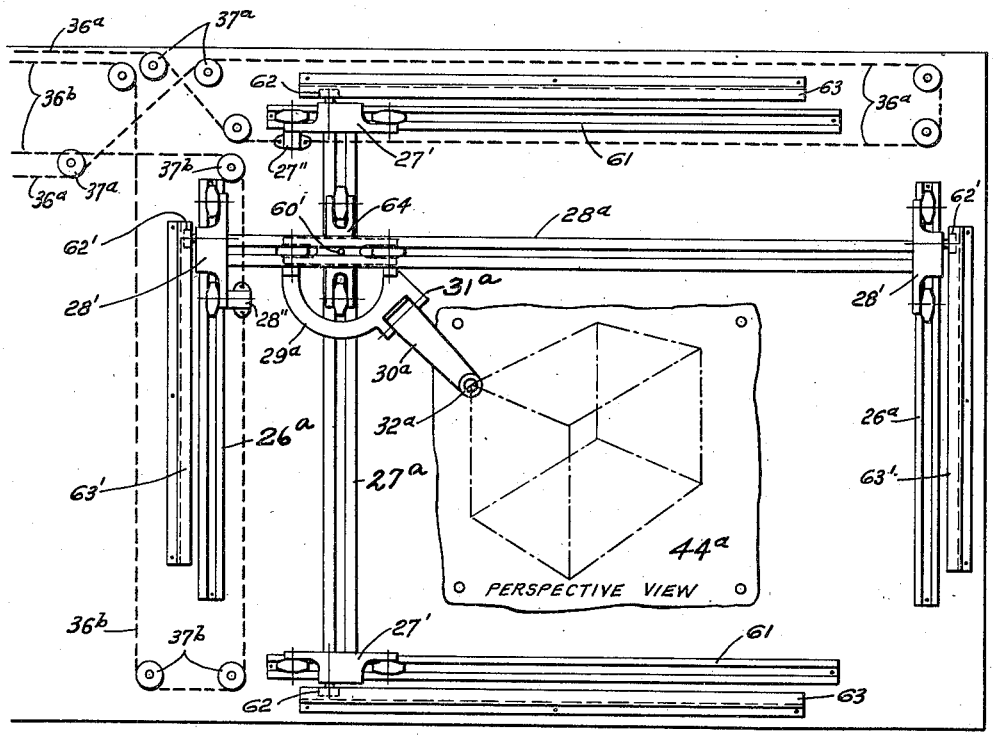
INVENTOR
FRANK L. DAVIS JR.
BY
ATTORNEY

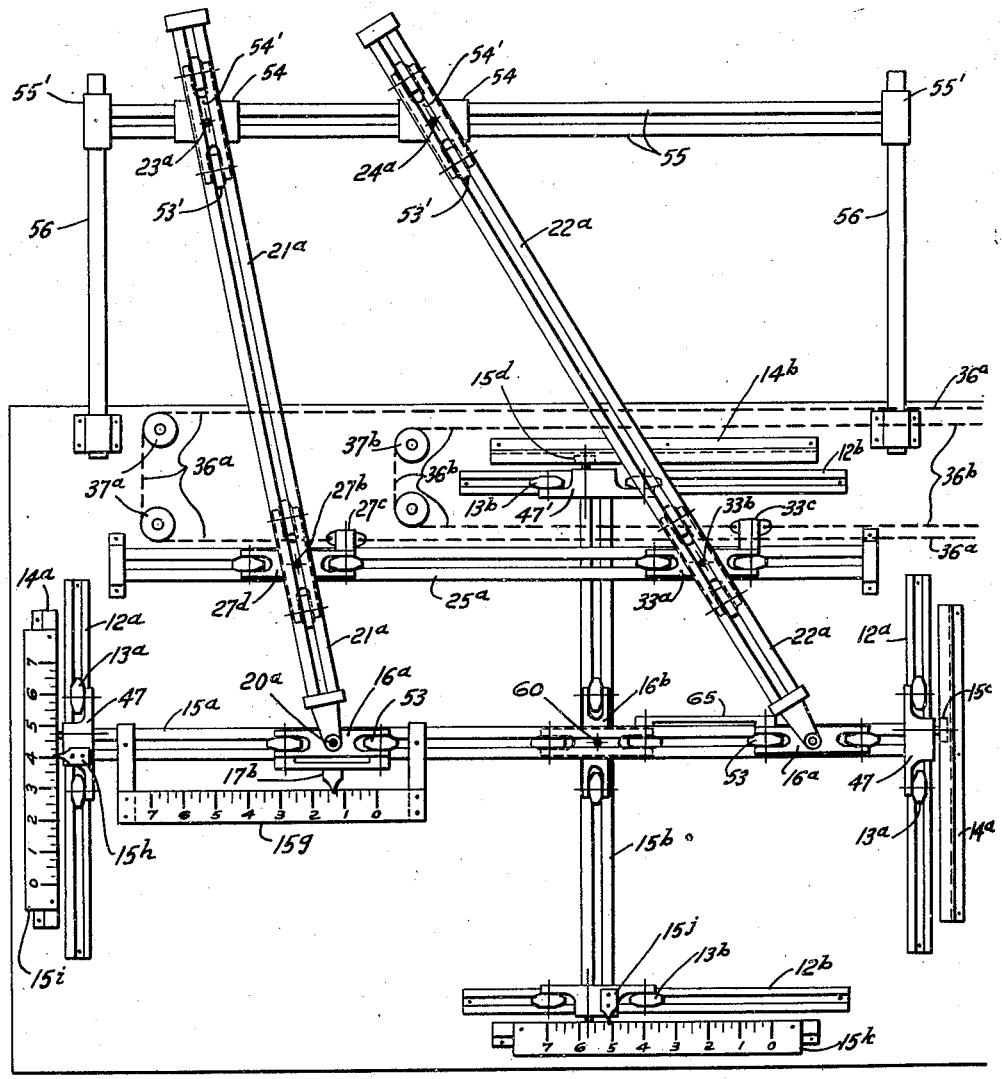

INVENTOR
FRANK L. DAVIS JR.
BY
ATTORNEY

May 25, 1948. F. L. DAVIS, JR 2,442,117
DRAWING APPARATUS (PERSPECTOGRAPH)
Filed Sept. 21, 1945 7 Sheets-Sheet 7

INVENTOR
FRANK L. DAVIS JR.
BY
ATTORNEY

Patented May 25, 1948

2,442,117

UNITED STATES PATENT OFFICE 2,442,117

DRAWING APPARATUS (PERSPECTOGRAPH)

Frank L. Davis, Jr., Kenilworth, N. J.

Application September 21, 1945, Serial No. 617,818

5 Claims. (Cl. 33—18)

The invention relates to drawing apparatus and more particularly to drawing apparatus for use by draftsmen and others in preparing perspective drawings.

Heretofore, the preparation of perspective drawings has presented vexatious problems involving considerable time and being dependent upon the skill and ability of individuals for solution. Under such conditions, the accuracy and reliability of the resulting perspective drawings are dependent entirely upon the skill and ability of the individual draftsman and, obviously, vary in accuracy and reliability in complete accord with the degree of skill and ability possessed by the individual doing the work. It has been the practice for such individuals to use several well-known so-called methods of graphical construction in preparing perspective views, which methods are time-consuming and involve many difficulties.

For a long time, attempts have been made to devise a machine that will perform all the routine operations of perspective drawing. So far, however, the manipulation of the machines has proved to be more time-consuming than the work they are designed to eliminate. One such machine recently designed cost about five thousand dollars and a well-trained engineer was required to use it.

The instant invention has for its object to provide a novel apparatus for perspective drawing which is economical in cost and which avoids the objections and disadvantages inherent in existing machines.

The invention contemplates further the provision of a novel apparatus for perspective drawing which is simple in construction and which any intelligent person may operate efficiently without difficulty.

A further object of the invention is to provide a novel apparatus for perspective drawing which is accurate in its results and which may be used with a minimum of effort and which is of maximum reliability in the performance of its functions.

In addition, the invention seeks to provide a novel apparatus for perspective drawing which may be efficiently utilized to produce the desired results without the necessity for complicated mathematical calculations or measurements.

Other objects will appear from the description hereinafter, and the features of novelty will be pointed out in the claims.

In the accompanying drawings, which illustrate examples of the invention without defining its limits, Fig. 1 is a diagrammatic view illustrating a well-known method of graphical construction of a perspective view;

Fig. 2 is a plan view of an elementary form of the novel drawing apparatus;

Figs. 3 and 3—a constitute a plan view of another form of the novel apparatus, Fig. 3—a being the right-hand continuation of Fig. 3;

Fig. 4 shows a somewhat modified form of the parts shown in Fig. 3;

Figure 1:
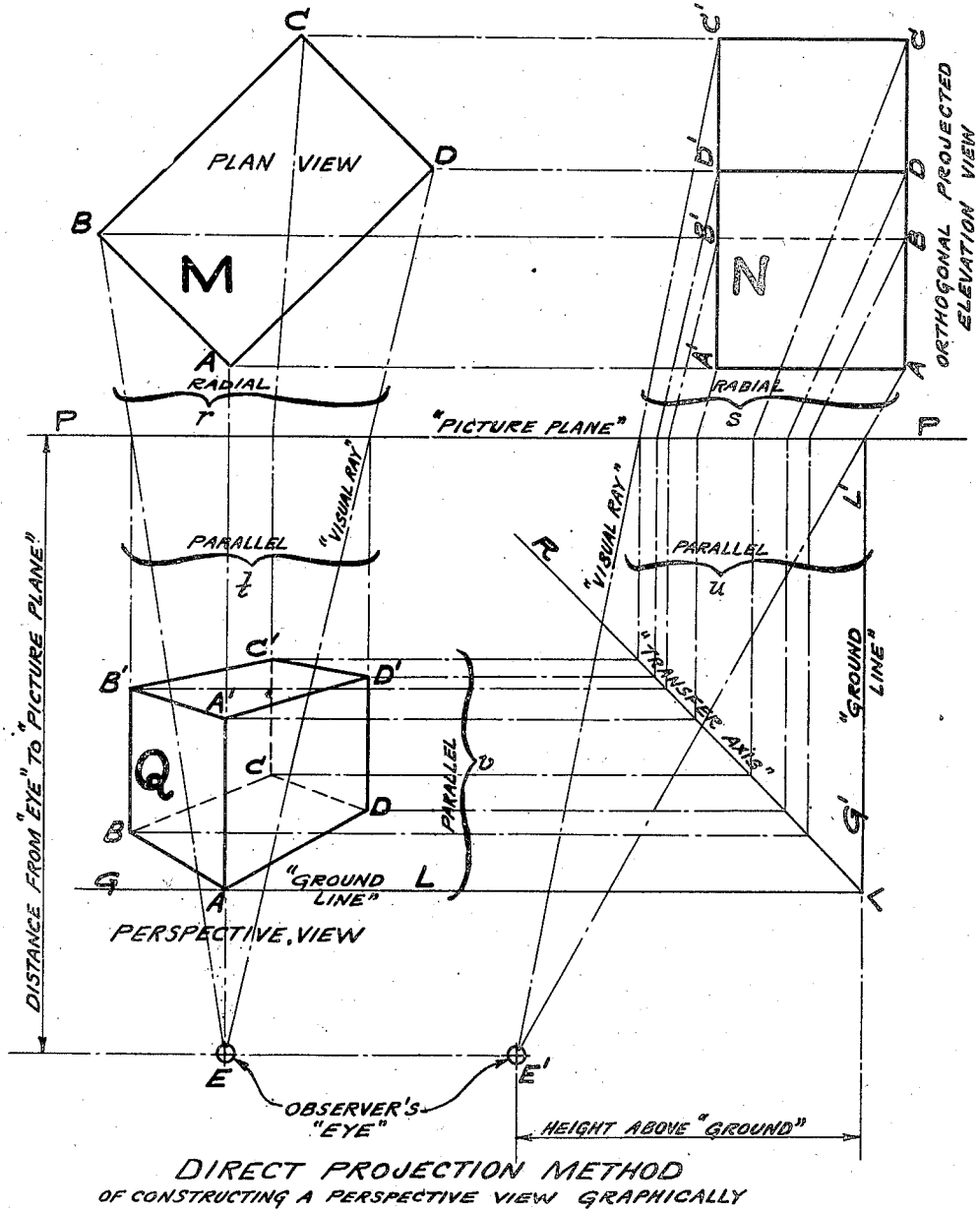

Figure 1 illustrates a direct graphical method of constructing a perspective representation of an object from scale drawings. The plan view M of the object is actual and the elevation N thereof is a prepared view, obtained by projection from the plan view to obtain the relative position of the verticals, the heights being actual to scale. The specific object, selected for purposes of simplicity is a rectangular prism with one side resting on the "ground," i. e., in a horizontal plane. Thus, all the edges of the object are either horizontal or vertical, requiring a minimum of construction lines to illustrate the method under discussion. It should be understood that neither this method nor the capacity of the novel apparatus to be described hereinafter, are limited to the particular form or disposition of the object selected for illustration.

In the plan view M the object is represented by the rectangle A, B, C, D. In the prepared orthogonal projected elevation N, the same letters A, B, C, D, identify the lower ends of all vertical edges, while the letters A', B', C', D' indicate the upper ends of the corresponding verticals. Thus, the extreme contour of the object in elevation, as illustrated, is defined by the rectangle A, A', C', C; the dotted line B, B' shown in the elevation N representing an invisible edge on the far side of the view. Such an edge would be omitted in practical construction but is shown here to complete the solid object.

In Fig. 1 the point E represents the eye of the observer relative to the object in the plan view M, and E' indicates the corresponding eye position relative to the object in the elevation N, said eye position E' being assumed to be at some distance above the object, to obtain what is commonly referred to as a "bird's eye view" thereof. The eye points E and E' are both located the same distance from a vertical plane passing through the nearest edge of the object in views M and N. Lines r and s radiating from the points E and E', respectively, connect said points with all points representing the corners of the illustrated prism. The lines r and s represent what are termed "visual rays" and constitute straight lines from the eye to each point in question. At a point between the "eyes" and the views M and N, a line PP is drawn to represent an edge view of an imaginary plane perpendicular to the ground and termed the "picture plane." The latter intercepts all the visual rays r and s.

From the points at which the visual rays r, from E to the plan M, intersect the "picture plane" PP, parallel lines t of convenient but, so far, indefinite lengths, are extended vertically downward. In a similar manner, parallel lines u extend downwardly from the points at which the lines s from E', to the elevation N intersect the "picture plane" PP.

A horizontal line GL, termed the "ground line," is drawn in a convenient location. For convenience, the vertical line of the group u which is farthest to the right, i. e., extends from the point at which a line s, from E' to A, intersects the "picture plane" PP, may be taken as a ground line relative to the elevation N, as indicated by G'L'. The angle between GL and G'L' is now bisected by a line RL which will be used as a reference axis for transferring the vertical projection lines u from the picture plane PP (as derived from N) into horizontal projection lines v. The latter may be continued until they cross the vertical projection lines t derived from M in the manner previously described.

If now each point in both the plan view M and the elevation N is traced individually along the construction lines (derived as above) to their respective intersection, the point so found will be the corresponding point in a perspective view representing the object. By connecting appropriate points so found, with straight lines, the perspective view Q will be constructed. In actual practice, the dotted line B—B' shown in the elevation N to simplify the description would be omitted as being invisible.

It may be noted, if all lines in the perspective Q which slope upwards toward the right are extended or "produced" that they will meet at a common point termed the "vanishing point", and that all lines sloping upwards toward the left, if produced, will also meet at another "vanishing point." It will be found that these two vanishing points are on the same horizontal level, and that a line joining said points would correspond to the "horizon" in another method of constructing perspective views in which the two vanishing points system is used. With the foregoing as a basis, the construction and operation of the novel drawing apparatus will be readily understood.

In Fig. 2, I have illustrated diagrammatically an elementary form of the novel apparatus, it being understood that other corresponding arrangements of the parts may be substituted to secure other locations of the several scale views to minimize the area of drawing board required, or to meet requirements of manufacture etc., without in any way departing from the functions and operations of the apparatus.

In Fig. 2, for convenience, the indications North, South, East and West have been appropriately placed, and in the following description will be utilized in setting forth directions of movement in planes parallel to the paper.

As illustrated in Fig. 2, the novel drawing apparatus comprises parallel motion straight-edges 15 and 15' located at right angles to each other. As a means for insuring such parallel motion, I have indicated fixed tracks formed by wires or other parallel elements 12 and 12', respectively, on which are adapted to run double pulleys 13, 13' mounted on the ends of the straight-edges 15, 15', respectively, and connected by crossed wires, cords or other transmission members 14, 14', respectively, so that the two pulleys on a given straight-edge will be held to rotate at the same speed but in opposite directions as required. A single carriage 16, provided with means for removably carrying a tracer point 17, is slidably mounted on the straight-edge 15 for the purpose to be more fully explained hereinafter. The straight-edges 15 and 15' are slidably connected by means of a double carriage 16'. The arrangement is such that the straight-edge 15 is capable of sliding relatively to the straight-edge 15' in a north and south direction, while the straight-edge 15' is slidably movable on the straight-edge 15 in an east and west direction.

The double carriage 16' comprises two similar sections, one slide portion of which is movable longitudinally along the straight-edge 15, and the other slide portion at a different level is free to move along the straight-edge 15'. The two sections constitute one unit with a fixed relationship to one another, in which their longitudinal axes are 90° apart. The position and movement of the double carriage 16' will always be a resultant of the position and movements of the two straight-edges 15 and 15'.

On each of the carriages 16 and 16' are mounted sleeves 18 and 19, respectively, pivotally movable in horizontal planes, on vertical pivot pins 20 suitably fixed in place on said carriages. The sleeves 18 and 19 slidably accommodate beams 21 and 22, respectively, one end of each beam 21 and 22 being pivoted at 23 and 24, respectively. The pivots 23 and 24 correspond respectively to the 'eyes" E and E' of the graphical construction method illustrated in Fig. 1, and the beams 21 and 22 correspond to the "visual rays" r and s thereof. The pivots 23, 24 are stationary during each operation of the apparatus but may be adjusted or set to any desired position, it being understood that in each case the pivot 23 will be placed at the same distance from the straight-edge 15 as the pivot 24, so that the two pivots will be on the same east-west line.

In addition to the elements so far referred to, two fixed tracks 25 and 26 are provided in the apparatus, the track 25 extending east and west parallel to the straight-edge 15, while the track 26 extends north and south parallel to the straight-edge 15'. The tracks 25 and 26, accordingly, are located at right angles to each other. Try squares 27 and 28 are arranged to travel on these tracks 25 and 26, one limb of each try square being guided by said tracks, respectively, and the other limbs thereof, overlapping each other as shown in Fig. 2. Small supporting rollers 27', 28' at the ends of these other limbs are adapted to run on the drawing board. A co-ordinating ring 29 is located at the point at which said other limbs of the try squares 27 and 28 overlap each other and slidably embraces said other limbs of both try squares as illustrated. The positions and movements of this co-ordinating ring 29, therefore, are always the resultant of the positions and movements of the individual try squares 27 and 28 as will more fully appear hereinafter. An arm 30 is hinged at 31 to the coordinating ring 29, preferably on the peripheral edge thereof, said arm 30 extending radially outward from said ring 29 a convenient distance and being provided at its outer free end with means for removably holding a pencil 32 or other conventional marking or indicating device. The arm 30 is pivoted or hinged on the ring 29 to enable the pencil 32 or its equivalent to be lifted out of contact with the associated drawing paper or sheet at will when desired, as will appear more fully further on in the description.

In addition to the try square 27, a carriage 33 also travels on the track 25 and carries a pivoted sleeve 34 which slidably accommodates the beam 22, a similar pivoted sleeve 35 being carried by the try square 27 for the slidable accommodation of the beam 21.

Through the medium of a suitable tension member or transmission member, such as a cord, wire or chain 36 passing over pulleys 37 and connected at 38 with the carriage 33 and having its opposite ends attached at 39 and 40 to the try square 28, the movements of the carriage 33 in directions "east" or "west" causes the try square 28 to move in the direction "south" or "north," respectively, a distance equal to the travel of the carriage 33.

The track 25 corresponds to the "picture plane" illustrated by the line PP in the graphical method illustrated in Fig. 1. The tension member 36 and the pulleys 37 may be likened to the reference axis RL of Fig. 1, at which vertical projection lines are bent 90 degrees into horizontal projection lines having the same relative spacing.

To trace the operation of the machine I will make use of conventional plan and elevation views of a simple house form. The plan view 41 in such case will be attached to the drawing board (on which the apparatus is assumed to be mounted) in such a position relative to the pivot 23 ("eye" E in Fig. 1) as is desired both as to distance from the eye and as to angular relation. A side elevation 42 and an end elevation 43 will be attached to said drawing board at such relative height to pivot 24 ("eye" E') as desired, and in a convenient location in the directions north or south, but with the ground lines of the two views 42 and 43 parallel to the straight-edge 15'.

A blank sheet of paper 44 is attached to the aforesaid drawing board in the space normally within the range to be swept over by the pencil 32 or its equivalent, this sheet of paper 44 being designed to have the desired perspective view produced upon it, directly, by the manual manipulation of the apparatus, through the interaction of its component parts. This is accomplished without the necessity for establishing vanishing points, measuring points, visual rays or projection lines of any sort. The apparatus when in use operates as follows:

With the pencil 32 held off the paper 44, the straight-edge 15' is moved to coincide, as shown, with the ground floor lines $k, j$ and $h, g$ of the house, in the elevations 42 and 43, respectively, and the tracer point 17 is shifted into registry with the corner $a$ in the plan view 41. The pencil 32 is then placed in contact with the sheet of paper 44. The straight-edge 15' is then held stationary and the tracer 17 is moved over the lines connecting the corners $a, b, c, d$ and back to $a$, said lines representing the contour of the house in the plan view 41. These operations cause the pencil 32 or its equivalent to draw the contour lines connecting the corners $a', b', c', d'$ and back to $a'$ on the sheet of paper 44. In a similar manner with the straight-edge 15' shifted toward the west until its "western" line coincides with the lines $pn$ and $ml$ in views 42 and 43, respectively, and again held stationary in this shifted position, the tracer 17 is again moved along the contour lines connecting $a, b, c, d$ and back to $a$, whereby the pencil 32 or its equivalent will be made to draw the contour lines $p'n', n'l', l'm'$, and $m'p'$ on the sheet of paper 44 as also illustrated.

By moving the straight-edge 15' "westward" through the distance of the point $q$ from the line $gh$ in the end elevation 43 and then, while holding said straight-edge in this position, moving the tracer point 17 along the line $ef$ of the plan view 41, the pencil 32 or its equivalent will be made to draw, on the paper 44, the line $e'f'$ representing the ridge of the roof.

By holding the tracer 17 stationary over the point $a$ in the plan view 41 and moving the straight-edge 15' through the distance $gl$ in the end elevation 43, the pencil 32 or its equivalent will draw the vertical line $a'p'$. In like manner, by holding the tracer 17 successively over the points $b, c$ and $d$ in the plan view 41 and moving the straight-edge 15' through the same distance, i. e., $gl$ in the end elevation 43, which distance is equal to $mh, nj$, or $pk$, the pencil 32 or its equivalent will produce the corresponding vertical lines $n'b', l'c'$, and $m'd'$, in correct location and of correct length on the sheet of paper 44.

For drawing the roof hip lines $l'e', m'e', n'f'$, and $p'f'$, a slightly different method of operation will be required since the hip lines of said roof are inclined, that is to say neither horizontal nor vertical. It may be noted at this point that the difficulty is not the inability of the apparatus to make the necessary movements but rather lies with the operator. This is due to the fact that to manipulate the apparatus correctly, it would be necessary for the operator to traverse the tracer 17 from $a$ to $f$ in the plan view 41 (for example) at a rate of travel corresponding to the rate of travel of the straight-edge 15' from the points $m$ or $l$ to $q$ in the end elevation 43. This obviously is a rather difficult physical operation and would probably result in a wavy line for the line $p'f'$ on the sheet of paper 44.

The remedy lies in drawing the hip lines with the aid of a conventional straight-edge or ruler, after the points $e', f'$ have been located either by having the apparatus draw the ridge line $e'f'$ in the manner described above, or by using the pencil 32 (or preferably a pricker substituted for it) to just mark these points $e', f'$. In either case, after locating the points $e', f'$, the arm 30 would be swung up out of the way and the conventional straight-edge or ruler would be applied to draw the hip lines $l'e', m'e', n'f'$, and $p'f'$, and might also be used to draw the ridge line $e'f'$ if not drawn previously.

It should be noted that the form of apparatus illustrated in Figs. 2 and 3 does not require the prepared orthogonal side view (N in Fig. 1) but uses conventional elevations directly. This is one of the chief purposes in utilizing the particular arrangement of parts illustrated in Fig. 2. Actually, were the carriage 16' provided with a pencil or equivalent marking implement, it would produce such an orthogonal side view since the straight-edges 15 and 15' always intersect at a point corresponding to the vertical and horizontal projection lines that would be drawn to obtain the series of points needed to construct such a view. The pivot 20 of sleeve 19, for instance, may be considered as producing an imaginary view, which through the medium of the beam 22 moving the carriage 33 and hence the try square 28, translates all east and west cut-offs on track 25 or "picture plane," into movements of the try square 28 of equal magnitude, in south and north directions, respectively.

It will be evident from the foregoing description that by simply shifting the tracer point 17 along the lines of the plan 41 and giving the straight-edge 15' different positions by shifting said straight-edge along the tracks 12', the apparatus shown in Fig. 2 will locate, on the sheet 44, a point corresponding to the perspective view to any desired point of the object represented in the views 41, 42 and 43. Furthermore, this apparatus will produce readily on said sheet, by means of the pencil 32 or its equivalent, the proper perspective representation of any line which is either vertical or horizontal in the said object. Other lines, however, will best be drawn with the aid of a conventional ruler or straight-edge as described above.

Another form of my apparatus, possessing certain advantages over the one first described above is shown in Figs. 3 and 3—a, with details illustrated more fully in Figs. 5 to 11. Reference numerals similar to those used in Fig. 2 have been applied to corresponding elements of Figs. 3 to 11 inclusive; many elements of Fig. 4 are the same as in Fig. 3.

Figure 9:
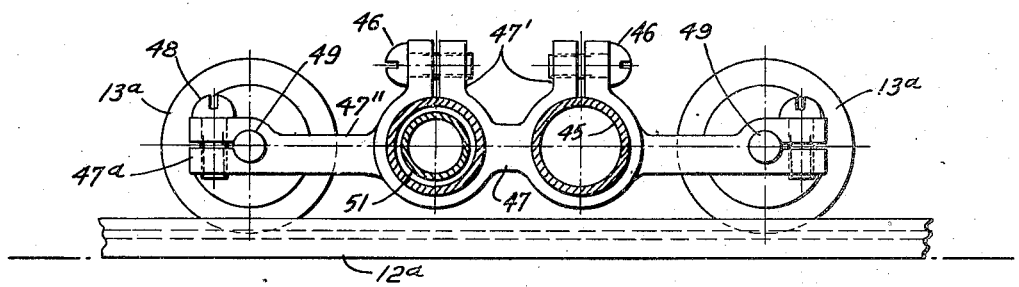
Fig. 9 shows a mounting included in the novel apparatus, with parts in section on the line 9—9 of Fig. 11 looking in the direction of the arrow at the opposite carriage.
Figure 10:
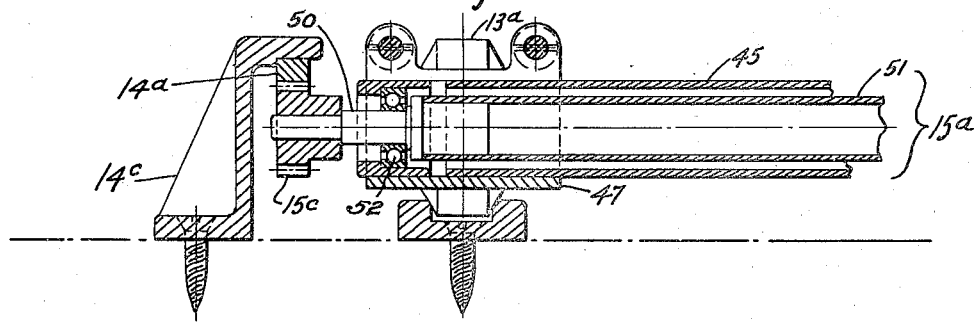
Fig. 10 is a sectional view on line 10—10 of Fig. 11 illustrating a rack and pinion arrangement embodied in the novel apparatus.
Figure 11:
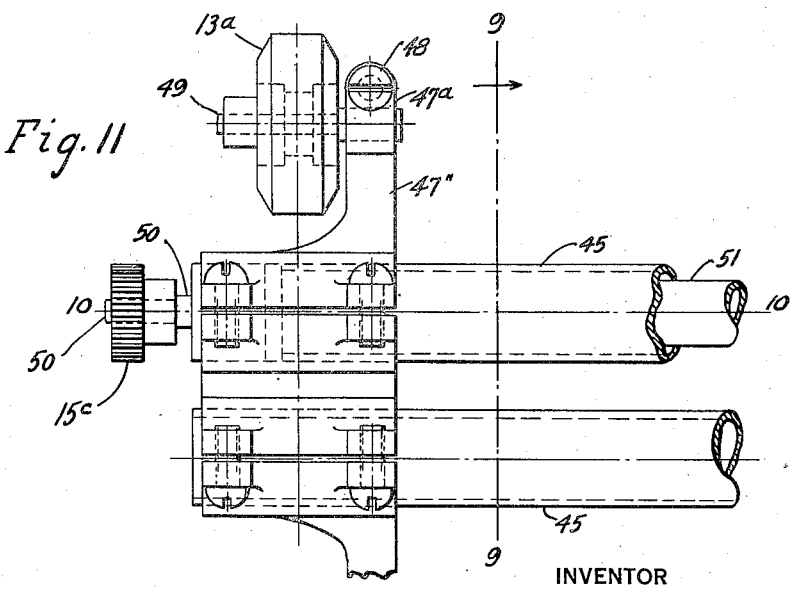
Fig. 11 is a fragmentary detail plan view of certain elements of Figs. 9 and 10.

Parallel-fixed tracks 12—a, and parallel-fixed tracks 12—b, arranged at 90° to the tracks 12—a, serve as guides for pairs of wheels 13—a, 13—b, respectively, journalled on the ends of straight-edges 15—a, 15—b, respectively. In addition, each of these straight-edges carries at each end a pinion 15—c, 15—d, respectively, journalled about an axis parallel to those of the respective wheels 13—a, 13—b, in a position between the wheels of the same pair. Details of these parts are shown in Figs. 9, 10 and 11. As illustrated, each straight-edge comprises two parallel tubular members 45, the ends of which are clamped by means of screws 46 between the split portions 47' of heads 47 having lateral extensions 47". These extensions have split portions 47—a in which are fastened, by the clamping action of screws 48, the axles 49 on which the respective wheels (13—a or 13—b) are journalled. The pinions (15—c or 15—d) are secured rigidly to the ends of stub shafts 50 connected rigidly by a torque member 51, here shown as a tube fitted axially (without contact) into one of the tubular members 45. The unit formed by the torque member 51 and the stub shafts 50 is mounted to turn on ball bearings 52 interposed between the said shafts and the member 45 surrounding them. The pinions 15—c, 15—d, are in mesh with fixed racks 14—a, 14—b parallel to the tracks 12—a and 12—b, respectively; preferably these racks are on the underside of the top portions of carriers 14—c (Fig. 10) so that the racks and the pinions meshing therewith are protected from dust, etc. The rack and pinion device just described, in conjunction with the torque member 51, insures a parallel motion of the straight-edge 15—a or 15—b, respectively.

Along the straight-edge 15—a (which extends over the straight-edge 15—b, see Figs. 3 and 4) are adapted to move two carriages 16—a, to one of which is pivotally connected a beam 22—a, while the other has a similar pivotal connection with a beam 21—a and is also provided with means for removably carrying a tracer point 17—a to be used in connection with the plan view 41—a (Fig. 3) tacked to the board carrying my drawing apparatus. The two pivots 20—a are perpendicular to the plane of such board. Each carriage 16—a is provided with wheels 53 having beveled peripheries (like the ones shown more clearly in Fig. 8) adapted to run lengthwise on the spaced parallel tubes 45 which form the body of the straight-edge 15—a.

Each of the beams 21—a, 22—a, is shown as made of parallel spaced tubes connected at their ends by suitable heads, the pivots 20—a being at the ends adjacent to the respective carriages 16—a. Near their other ends the beams 21—a, 22—a, extend in contact with and rest upon the wheels of inverted carriage units 54' pivoted on pins 23—a, 24—a, respectively, which pins 23—a, 24—a project between the tubes forming part of said beams. These pins are stationary during each particular problem for which the apparatus is employed and constitute temporarily fixed pivots on which the beams 21—a, 22—a, may slide and swing. These pins function also as pivots for the carriages 54', on the wheels 53' of which the said beams may move lengthwise. In order that the position of these pivots may be changed according to the conditions of each particular problem, they are secured to slides 54 which may be adjusted along rods or tubes 55 parallel to the straight-edge 15—a and to the elements 12—b, 14—b; the slides 54 may be locked by set screws or otherwise in any position to which they may have been shifted along the rods or tubes 55. The latter are connected at their ends by sleeves 55' normally held stationary, as by means of set screws, on fixed reach rods 56 which are parallel to the straight-edge 15—b and to the elements 12—a, 14—a. This construction enables the tubes 55, and with them the slides 54, and pivots 23—a, to be adjusted to any desired position along the reach rods 56, the tubes 55 remaining parallel to the straight-edge 15—a.

As mentioned hereinbefore, the straight-edge 15—b extends under the straight-edge 15—a. At the crossing point I arrange a double carriage 16—b (Figs. 3 and 4) composed of two similar units movable in unison either in a direction lengthwise of the straight-edge 15—a (when the other straight-edge 15—b moves in that direction), or in a direction length-wise of the straight-edge 15b (when the other straight-edge 15—a moves in such direction). Details of the lower section of carriage 16—b are shown in Figs. 5 to 8, inclusive. This section comprises a body portion 57 provided with forked arms 57' in which are held stub axles 58, by the clamping action of screws 59 on the split ends 57" of said arms. On these axles are mounted to turn, with the interposition of ball bearings 52—a, the two wheels 53—a having beveled peripheral edges for contact with the parallel members 45 of straight-edge 15—b, along which the lower section of carriage 16—b is adapted to run. At its center the body portion 57 has a sleeve 57—a extending between the parallel members 45 of straight-edge 15—b. The upper section of carriage 16—b is a duplicate of the lower one, but is used in a position at 90° from the lower section, so that the wheels of the upper section will be in contact with the underside of the parallel members 45 of the straight-edge 15—a, and the two carriage sections are connected (preferably rigidly) by a pin 60 (Figs. 3, 4, 5 and 6). As indicated in Figs. 3 and 4, the upper section is inverted relatively to the lower section, so that while the wheels 53—a of the lower section will run on the upper surface of the members 45 of straight-edge 15—b, the wheels 53—a of the upper carriage section will travel on the lower surface of the members 45 of straight edge 15—a.

Figure 5:
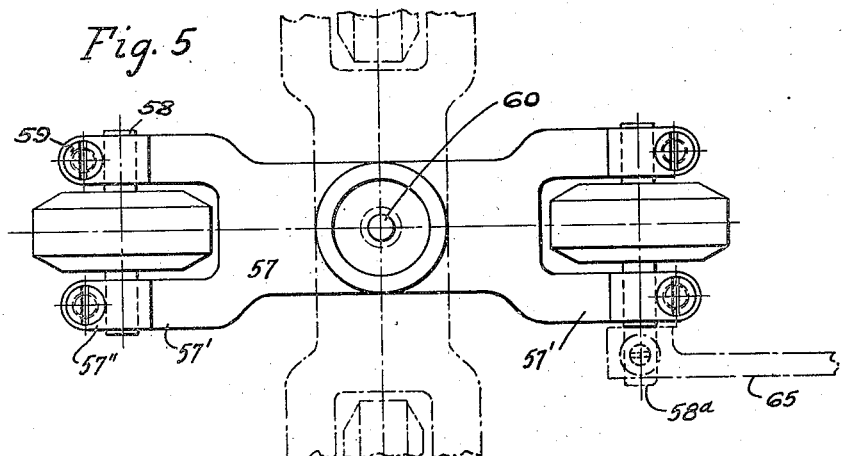
Fig. 5 is a detail plan view of a carriage unit included in the apparatus.
Figure 6:
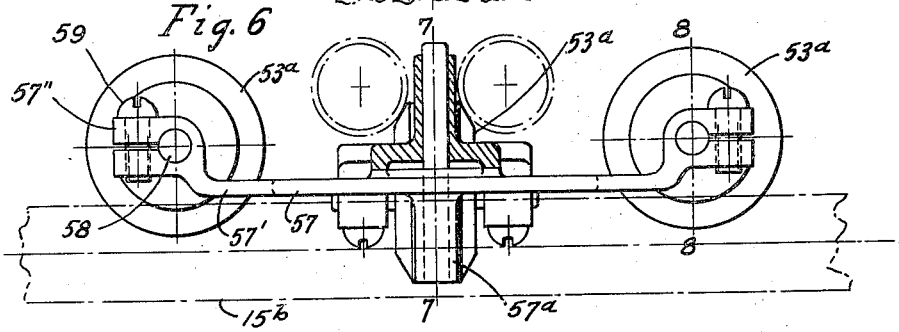
Fig. 6 is a detail side elevation thereof.
Figure 8:
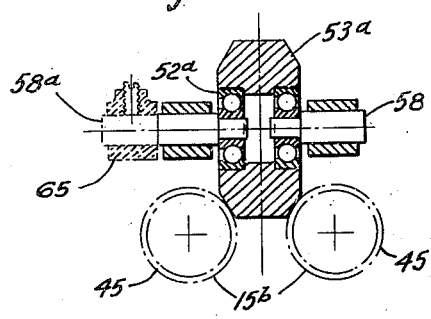
Fig. 8 is a similar view on the line 8—8 of Fig. 6.
Figure 7:
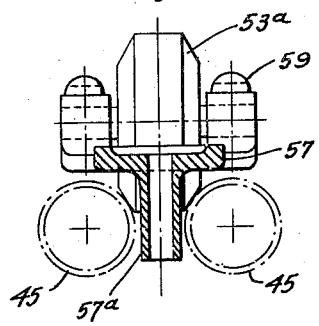
Fig. 7 is a detail section on the line 7—7 of Fig. 6.

The carriage 16—b and the right-hand carriage 16—a are connected by a link 65 so as to move in unison along the straight-edge 15—a; the link 65 may, as shown in Figs. 5 and 8, be removably attached to outward extensions 58—a of the axles 58. Normally, that is to say, when the perspective to be produced is a so-called "bird's eye" view, the carriage 16—b will be between the two carriages 16—a, as shown in full lines in Fig. 3. As above stated, the link 65, however, is detachable and may be transferred to the opposite side of the carriage 16—b, and the right-hand carriage 16—a brought to a position between the other carriage 16—a and the carriage 16—b, as indicated by dotted lines, for a purpose explained hereinafter.

A fixed track 25—a, composed of two parallel rods or tubes connected at their ends (similar in this respect to the straight-edges 15—a, 15—b, and to the beams 21—a, 22—a), extends parallel to the straight-edge 15—a, and on this track are mounted to travel double carriages 27—d, 33—a, similar in construction to the double carriage 16—b and provided with pins 27—b, 33—b, extending between the parallel members of the beams 21—a, 22—a, respectively, to form connections which, as these beams swing on their pivots 23—a and 24—a, respectively, will move the carriages 27—d, 33—a, along their track 25—a. In this case, however, the upper and the lower sections of each of the double carriages 27—d, 33—a, will not always remain in the same relative angular position, and the connection 27—b, 33—b, of these upper and lower sections must therefore be a pivotal one, permitting the section which engages the beam 21—a or 22—a to swing with the beam and thus to form different angles with the section which engages the track 25—a.

Each of the carriage sections engaging the track 25—a is provided with an arm 27—c, 33—c, respectively, to which is secured a cord, wire, or other tension member 36—a, 36—b, respectively, extending in opposite directions from said arm and passing in contact with guide pulleys 37—a, 37—b, respectively, rotatable about fixed axes. The left-hand position of these tension members and guides is shown in Figs. 3 and 4, while Fig. 3—a shows the right-hand continuation, both for Fig. 3 and for Fig. 4.

In Fig. 3—a, the tension member 36—a is shown attached to an arm 27" on a carriage 27' rigid with one end of a member 27—a having a similar carriage (without such arm as 27") at the other end, these carriages being mounted to travel along fixed parallel tracks 61 and also having pinions 62 to travel along fixed parallel racks 63, these details being illustrated as agreeing in construction with the straight-edges 15—a, 15—b, and their associated elements 41, 13—a, 13—b, 12—a, 12—b, 14—a, 14—b, 15—c, 15—d. The tracks 61 and racks 63 are parallel to the straight-edge 15—a. The tension member 36—b is attached to an arm 28" on a carriage 28' rigid with one end of a member 28—a having a similar carriage at its other end. These carriages travel on fixed parallel tracks 26—a and also have pinions 62' arranged to roll on fixed racks 63' parallel to the tracks 26—a. These parts associated with the tension member 36—b are of practically the same construction as those associated with the tension member 36—a, but their position is different, the tracks 26—a and the racks 63' being parallel to the straight-edge 15—b; that is, at right angles to the tracks 61 and to the racks 63.

Along the member 28—a is adapted to travel a double carriage 64 of substantially the same construction as the carriage 16—b used at the crossing point of the straight-edges 15—a, 15—b. The lower section of this carriage has wheels running on the upper faces of the parallel rods or tubes forming the member 27—a, while the wheels of the upper inverted section run on the underside of the tubes forming the member 28—a. To the carriage 64 is secured rigidly the co-ordinating member 29—a, to which an arm 30—a is hinged or pivoted at 31—a, said arm extending radially with respect to the central pin 60' connecting the two sections of the carriage 64, preferably at an angle of 45° relatively to the members 27—a, 28—a. The outer end of the arm 30—a carries a marking device 32—a for producing, on a sheet 44—a fastened to the drawing board, a perspective view of the object represented by the plan view 41—a and the elevation 42—a fastened to said board within the range of movement of the tracer point 17—a and of the straight-edge 15—b, respectively.

The operation of the apparatus shown in Figs. 3 and 3—a is substantially similar to the one described in connection with Fig. 2. Thus, to draw a perspective representation of the top of the object (a cube has been chosen for the sake of simplicity), the straight-edge 15—b will be brought to a position in which the top line of the elevation 42—a (Fig. 3) will register or coincide with a line 15—e scribed or otherwise marked on the underside of a transparent strip 15—f rigidly connected with said straight-edge 15—b. The tracer point 17—a will then be brought into registry with one of the corners of the plan view 41—a, by properly moving the straight-edge 15—a along the tracks 12—a, and the carriage 16—a at the end of the beam 21—a, along said straight-edge 15—a. Every movement of this straight-edge along the tracks 12—a will impart a like movement to the pivots 20—a and thereby cause the beams 21—a, 22—a to swing about their stationary pivots or fulcrums 23—a, 24—a, the latter having been set to the desired positions. Such movement of the beams 21—a, 22—a, will shift the carriages 27—d, 33—a, along their track 25—a in the same direction if the link 65 and the carriage 16—a of beam 22—a are in the position indicated by full lines in Fig. 3. With the parts in the position shown in this figure the tension members or transmission members 36—a, 36—b will cause the members 27—a, 28—a, 32—a, to assume the position shown in Fig. 3—a. From the arrangement of the transmission members 36—a, 36—b, illustrated, particularly near the upper left-hand corner of Fig. 3—*a*, it will be clear that any movement of the carriage 27—*d* toward the left will cause the member 27—*a* to move toward the right, and vice versa, while any movement of the carriage 33—*a* toward the left or toward the right will cause the member 28—*a* to move up or down, respectively, in Fig. 3—*a*; that is to say, toward or away from the right-hand leads of the transmission member 36—*a* in that view. If starting with the position shown in Figs. 3 and 3—*a*, the tracer point 17—*a* is moved along the outline of the plan view 41—*a*, and the straight-edge 15—*b* is held stationary, the resulting movements of tracer-carriage 16—*a* along the straight-edge 15—*a* and of the latter along the tracks 12—*a* will swing the beams 21—*a*, 22—*a*, on their pivots 23—*a*, 24—*a*, and cause them to shift the carriages 27—*d*, 33—*a*, respectively, along their fixed track 25—*a*. This movement of the carriages 27—*d*, 33—*a*, will be transmitted by the connections 36—*a*, 36—*b*, to the members 27—*a*, 28—*a*, respectively, in such a way that the marking device 32—*a* will produce at the upper portion of the paper 44*a*, a perspective representation of the top of the cube. If then the straight-edge 15—*b* is shifted in such fashion as to bring the line 15—*e* into registry with the bottom line of the elevation 42—*a*, and (while holding said straight-edge in this position) the tracer point 17—*a* is again moved along the outline of the plan view 41—*a*, this will cause the marking device 32—*a* to produce, at the lower portion of the paper 44—*a*, a perspective representation of the bottom or base of the cube. To complete the perspective view shown in Fig. 3—*a* I bring the tracer point 17—*a* to one of the corners of the plan view 41—*a* and, while holding said tracer point in this position, move the straight-edge 15—*b* and with it the carriage 16—*b*, the link 65 and the carriage 16—*a* connected to the beam 22—*a*, along the straight-edge 15—*a*, from a position in which the line 15—*e* registers with the top (or the bottom) of the elevation 42—*a*, to a position in which said line registers with the bottom (or the top) of said elevation. This will cause the beam 22—*a* to swing on its pivot 24—*a* and shift the carriage 33—*a* in such a way that the marking device 32—*a* will draw one of the four vertical lines of the perspective view 44—*a*. By repeating this operation after shifting the tracer point 17—*a* to a different corner of the plan view 41—*a*, I cause the marking device 32—*a* to produce another of the vertical lines of the perspective view, the latter being thus completed after four such operations. Since all the lines of the particular object depicted (a cube) are either horizontal or vertical, the entire perspective view can be produced exclusively by the movements imparted to the coordinating member 29—*a* and the pencil 32—*a* carried thereby.

The perspective view obtained as just described is a view looking from above, or a "bird's eye" view. When it is desired to obtain a view looking from below, or a "worm's eye" view, I shift the parts in such a way that the beams 21—*a*, 22—*a*, instead of being inclined in the same direction (downwardly from left to right in Fig. 3, full lines) will be inclined in opposite directions, so that a movement of the straight-edge 15—*a* along the tracks 12—*a* will cause simultaneous movements of the carriages 27—*d*, 33—*a*, in opposite directions along the track 25—*a*. For this purpose the link 65 and the carriage 16—*a* connected with it are shifted to the opposite side of the double carriage 16—*b*, as indicated by dotted lines, causing the beam 22—*a* to become inclined downwardly from right to left, with a resulting reversal in the direction of movement for the carriage 33—*a* and the member 28—*a*, relatively to their movements in the position first described. The construction of the double carriage 16—*b* and of the link 65 are such that the shifting of one of the carriages 16—*a* from one side of the carriage 16—*b* to the other can be effected readily.

In some cases, it may be found more convenient not to operate the apparatus from scale drawings or prints, as in the foregoing description, but from measurements. Fig. 4 indicates how the apparatus of Fig. 3 may be modified for this purpose. Instead of providing one of the carriages 16—*a* with a tracer point such as 17—*a* in Fig. 3, I furnish it with a pointer 17—*b* indicating on a scale 15—*g* rigidly secured to the straight-edge 15—*a* and parallel thereto. Another pointer 15—*h*, secured to one of the heads 47 of said straight-edge, indicates on a fixed scale 15—*i* parallel to the track 12—*a*. Finally, the head at one end of the straight-edge 15—*b* carries a pointer 15—*j* indicating on a fixed scale 15—*k* parallel to the track 12—*b*. The other parts of Fig. 4 are exactly the same as in Fig. 3, and it will be understood that Fig. 3—*a* represents the right-hand continuation of Fig. 4 as well as that of Fig. 3. The pointer 15—*j* and the scale 15—*k* perform functions similar to the line 15—*e* of Fig. 3 and to the lines of the elevation 42—*a* with which 15—*e* may be brought into registry. The scales 15—*g* and 15—*i*, with their pointers, indicate the position of the carriage on which the pointer 17—*b* is mounted, measured in two directions perpendicular to each other. It will be obvious that in the particular example illustrated, if the measurements according to which the pointers 17—*b*, 15—*h* and 15—*j* of Fig. 4 are set correspond to the plan view 41—*a* and the elevation 42—*a* of Fig. 3, the same perspective view will be obtained as in Fig. 3—*a*. It will be noted that for bringing the left-hand carriage 16—*a* of Fig. 4 to the desired position, two separate movements are required, one by shifting the carriage along the straight-edge 15—*a*, and the other by shifting the said straight-edge along the tracks 12—*a*; this differs somewhat from the operation described in connection with Fig. 3, in which the carriage having the tracer point 17—*a* is shifted simultaneously in both directions. With the arrangement of Fig. 4, only vertical lines or horizontal lines parallel to the picture plane (25—*a*) would be drawn directly by the apparatus, other lines being drawn separately by a conventional ruler or straight-edge after determining their end points with the aid of the apparatus.

I desire it to be understood that the term "straight-edge" as applied hereinbefore to the elements or members 15, 15′, 15—*a*, 15—*b*, has been used only for the sake of convenience and is not to be interpreted literally. In fact, under a strict interpretation, only the member 15′ of Fig. 2 could properly be called a straight-edge, the left-hand vertical line of said member being straight, for cooperation with certain lines or points of the views 42, 43. In Fig. 3, co-operation with view 42—*a* is effected, not with an edge of the member 15—*b*, but with the line 15—*e*. As to the member 15 of Fig. 2, the member 15—*a* of Figs. 3 and 4, and the member 15—*b* of Fig. 4, these do not require any straight-edges or other straight lines for co-operation with plan views, elevations, or the like. A feature common to the members 15, 15', 15—a, and 15—b, is that each of them has a straight longitudinal runway for a section of the double carriage 16' (Fig. 2) or 16—b (Figs. 3 and 4). Also, one member (15 or 15—a) of each pair crosses the other member (15' or 15—b) at right angles, and the longitudinal runway of said first-mentioned member serves to guide another carriage (16 in Fig. 2, 16—a in Fig. 3, and the left-hand member 16—a in Fig. 4). This second carriage is pivotally connected with one swinging beam (21 in Fig. 2, 21—a in Figs. 3 and 4), while the other swinging beam (22 in Fig. 2, 22—a in Figs. 3 and 4) has a similar connection with the first-mentioned carriage. While in Figs. 3 and 4, the pivotal connection of the beam 22—a is not directly on the double carriage 16—b, it will be noted that the link 65 compels said double carriage to move lengthwise of the member 15—a in unison with the right-hand carriage 16—a to which the beam 22—a is connected pivotally. This right-hand carriage and the double carriage 16—b, therefore, travel as a unit along the member 15—a, and to this unit the beam 22—a is connected pivotally. It will further be noted that the horizontally-moving member (15' in Fig. 2, 15—b in Figs. 3 and 4) of what may be called the "transmitter" portion of the apparatus will effect a vertical movement of one element (28 in Fig. 2, 28—a in Fig. 3—a) of what may be called the "receiver" portion of the apparatus, while the companion element (27 in Fig. 2, 27—a in Fig. 3a) of such receiver will be given a horizontal movement in response to a vertical movement of the other movable member (15 in Fig. 2, 15—a in Figs. 3 and 4) of the transmitter. It will also be noted that in Fig. 2, the co-ordinator 29 and with it marker-carrier 30 are actuated by the horizontally-moving vertical arm of the try square or carriage 27, and by the vertically-moving horizontal arm of the try square or carriage 28, each of said arms remaining parallel to its initial position throughout its movement.

The particular construction of carriage and its runway, the details of which are shown best in Fig. 8, is applicable in my apparatus wherever structural units of this character appear. That is to say, the element having a longitudinal runway comprises spaced parallel members of round cross-section, and the carriage traveling on said runway has wheels located between two neighboring parallel members and having beveled peripheries to engage such members. This construction of wheels with beveled peripheries running on spaced parallel members is indicated in Figs. 3 and 4 at 12—a, 13—a; 12—b, 13—b; 15—a, 16—a; 21—a, 27—d, 54'; 22—a, 33—a, 54'; and 25—a, 27—d, 33—a; also in Fig. 3—a at 26—a, 28'; 27—a, 64; 28—a, 64; and 61, 27'.

Although the present invention has been described in conjunction with a preferred embodiment, it is to be understood that modifications and variations may be resorted to without departing from the spirit and scope of the invention as those skilled in the art will readily understand. Such variations and modifications are considered to be within the purview and scope of the claims.

I claim:

1. In apparatus of the class described, a structure consisting of two elements arranged one above the other at an angle to each other, and a carriage having two superposed connected sections co-operating with the respective elements, each of said elements comprising spaced straight parallel members having rounded longitudinal surfaces, and each of said carriage sections having wheels with beveled peripheries fitted to engage said rounded surfaces of two neighboring parallel members of the respective element, the wheels of one carriage section engaging the upper surfaces of the lower element, and the wheels of the other carriage section engaging the lower surfaces of the upper element.

2. An apparatus of the class described, comprising a planar base, a pair of elongated members mounted thereon in superposed relation for movement in planes parallel to the base, said members crossing each other at right angles, means on the base guiding and confining each member to a rectilinear path of movement in the direction of the longitudinal axis of the other, a carriage connecting said members at the point of intersection and movable freely along the longitudinal axis of each, a second carriage on one of said members and movable freely along its longitudinal axis, two beams mounted to swing in a plane parallel to the base on pivot axes fixed during operation of the apparatus, said pivot axes being disposed on a line parallel to one of said elongated members, a pivotal connection between one beam and one carriage, a similar connection between the other beam and other carriage, a track on the base parallel to the elongated member having the two carriages thereon, an element movable along said track and having combined pivotal and sliding connection with one beam, a second element movable along said track and having similar connection with the other beam, marker means shiftable on the base, and an operating connection between each of said track-carried elements and the marker means whereby to shift the marker means in accordance with movements of the elongated members and the beams.

3. An apparatus of the class described, comprising a planar base, a pair of elongated members mounted thereon in superposed relation for movement in planes parallel to the base, said members crossing each other at right angles, means on the base guiding and confining each member to a rectilinear path of movement in the direction of the longitudinal axis of the other, a double carriage at the point of intersection of said members, said double carriage having a portion engaging one member for movement along its longitudinal axis and having another portion engaging the other member for movement along its longitudinal axis, a pair of separate single carriages on one of said members and movable along its longitudinal axis, a connector between one of the single carriages and said double carriage, two beams mounted to swing in a plane parallel to the base on pivot axes fixed during operation of the apparatus, said pivot axes being disposed on a line parallel to the elongated member mounting the single carriages, a pivotal connection between one beam and one of the single carriages, a similar connection between the other beam and the other single carriage, a track on the base parallel to said member on which the single carriages are mounted, an element movable along said track and having combined pivotal and sliding connection with one beam, a second element movable along said track and having similar connection with the other beam, marker means shiftable on the base, and a separate operating connection between each of the track-carried elements and the marker means whereby to shift the marker means in accordance with movements of the elongated members and the beams.

4. In apparatus of the class described, two elongated members crossing each at right angles, a double carriage connecting said members at the point of intersection, said carriage having a portion engaging one member and movable along its longitudinal axis and another portion engaging the other member and movable along its longitudinal axis whereby each member may be moved in the direction of the longitudinal axis of the other, a pointer on each member, a fixed scale cooperating with each pointer, another carriage engaging one of said members and movable thereon along its longitudinal axis, a pointer on said last-named carriage, a scale fixed to the member mounting said last-named carriage and cooperating with the carriage pointer, two beams mounted to swing on pivot axes fixed during operation of the apparatus, said pivot axes being disposed on a line parallel to the member which mounts both said carriages, a pivotal connection between one beam and one carriage, a similar connection between the other beam and the other carriage, and marker means operative in response to movement of said beams for the production of straight lines.

5. An apparatus of the class described, comprising a planar base, a pair of elongated members mounted thereon in superposed relation for movement in planes parallel to the base, said members crossing each other at right angles, means on the base guiding and confining each member to a rectilinear path of movement in the direction of the longitudinal axis of the other, a double carriage at the crossing point of said members, said carriage having a portion engaging one member for movement along its longitudinal axis and another portion at right angles to the first portion engaging the other member for movement along its longitudinal axis, a second carriage engaging one of said members for movement thereon along its longitudinal axis, a pivot support on said base and movable thereon to various positions of adjustment in a direction perpendicular to the longitudinal axis of the member mounting both said carriages, a pair of pivot fixtures movable on said support to various positions of adjustment along a line parallel to the longitudinal axis of the member mounting both said carriages, a beam having slidable and pivotal connection with one of the pivot fixtures and a pivotal connection with one of said carriages, a second beam having slidable and pivotal connection with the other pivot fixture and a pivotal connection with the other carriage, and marker means responsive to the movements of said elongated members and the beams.

FRANK L. DAVIS, Jr.

REFERENCES CITED

The following references are of record in the file of this patent:

UNITED STATES PATENTS

| Number | Name | Date |
| --- | --- | --- |
| 1,140,143 | Falvey | May 18, 1915 |
| 1,807,075 | Skar et al. | May 26, 1931 |
| 1,826,338 | Ackerberg | Oct. 6, 1931 |
| 1,993,456 | Roscher | Mar. 5, 1935 |
| 1,986,625 | DeLorenzi | Jan. 1, 1935 |
| 2,171,587 | McGregor | Sept. 5, 1939 |

FOREIGN PATENTS

| Number | Country | Date |
| --- | --- | --- |
| 17,455 | Great Britain | Oct. 31, 1890 |
| 27,646 | Germany | Oct. 12, 1883 |